Oct. 13, 1931. G. S. BINCKLEY 1,827,560
MEANS FOR TRANSMISSION OF MOTION
Filed Oct. 29, 1928
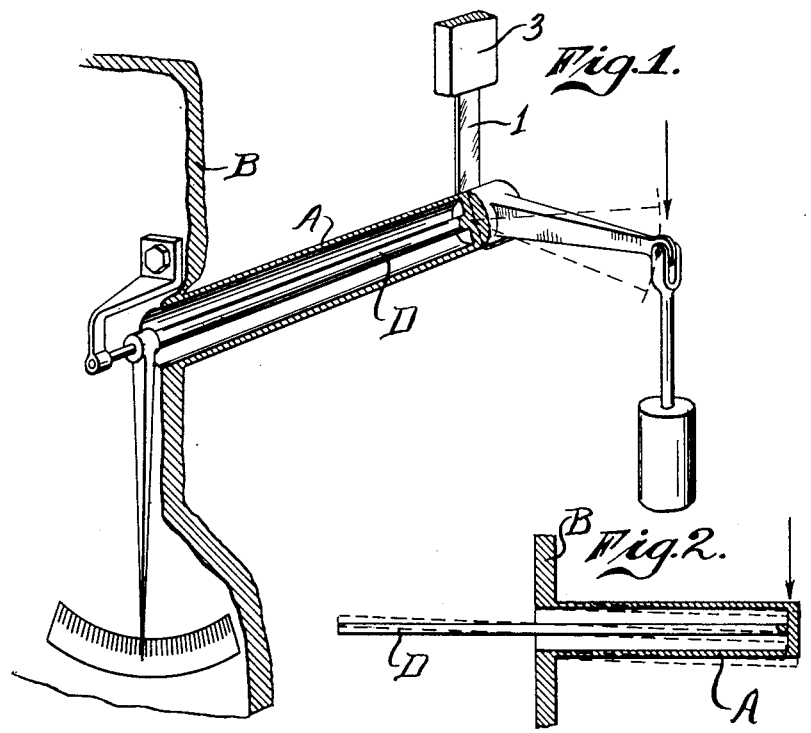
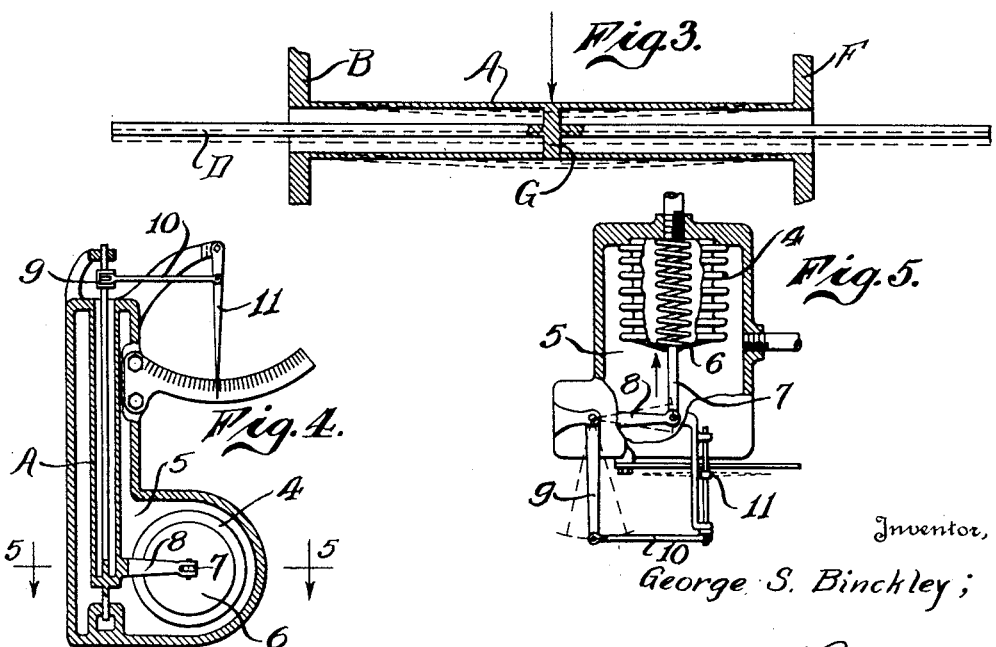
Inventor,
George S. Binckley;
By J. Calvin Brown
Attorney Patented Oct. 13, 1931

1,827,560

UNITED STATES PATENT OFFICE

GEORGE S. BINCKLEY, OF LOS ANGELES, CALIFORNIA

MEANS FOR TRANSMISSION OF MOTION

Application filed October 29, 1928. Serial No. 315,881.

This invention relates to means for the transmission of a limited amount of motion from one side of a wall to another, from the interior of a closed chamber to its exterior or from its exterior to its interior.

The object of the invention is to provide means whereby a limited amount of motion, originating on one side of a wall, may, without the existence of any opening in the wall, be transmitted through said wall without recourse to any means involving any friction, wear, or leakage.

A further object of this invention is to provide as an incident to the accomplishment of the first object, elastic resistance to the action of part or all of the force producing the motion to be transmitted, so that the elastic deformation of the essential elements of the invention shall perform the dual function of transmitting motion and providing an elastic resistance to the force producing such motion.

A further object of this invention is to produce, for the purpose set forth, simple, cheap, and reliable means adaptable to a wide range of pressure conditions, materials of construction, and practical applications.

With the above and other objects in view, the invention consists in the novel and useful provision, formation, construction, and relative arrangement of parts, members, and features, all as shown in the accompanying drawings, described generally, and more particularly pointed out in the claims.

In the drawings:
Figure 1 is a perspective view shown partly in section, of the preferred form of my invention, showing the rod connected to a pointer for indicating the magnitude of the force applied to produce torsional strain in the tube A, Figure 2 is a longitudinal section of the essential elements of my invention, illustrating its action under the application of a force transverse to the axis of tube A, Figure 3 is a longitudinal sectional view of a modified form of my invention, Figure 4 is a longitudinal sectional view of the preferred form of my invention as applied to an instrument for recording differential fluid pressures, and, Figure 5 is a plan view, partly in horizontal section, of Figure 4.

The essential elements of the preferred form of this invention are:

A wall B to which is firmly fixed a tube A, open at the end fixed to wall B, and closed at the other end, and a rod D attached to tube A at its sealed end. Tube A thus becomes in effect an integral part of wall B and rod D attached firmly to tube A and passing through tube A without contact with its walls, is in effect integral with this tube and with the wall B.

In the preferred form of this invention, as shown in Figure 1, the force producing the motion which it is desired to transmit through the wall B is applied in such a manner as to produce a torsional deformation of tube A. To give maximum effect to this force it is applied to the sealed end of tube A so that the torsional deformation produced will be a maximum at this point, and the rotation of the tube around its axis at its sealed end is transmitted directly through wall B by rotation of the rod D. The junction of tube A with the wall B is of such a nature as to preclude the possibility of any leakage or any movement as between the tube and the wall where they are joined. The other end of tube A is sealed with equal effect. The sealed end of the tube may be mounted in any suitable manner to permit slight rotation thereof about its axis under the influence of a torsional force applied thereto. As illustrated in Figure 1, the sealed end of the tube is secured to one end of a resilient metal ribbon 1 which extends partly around said sealed end of the tube, the ribbon being secured at its other end to any suitable mounting 3. Tube A may be circular, elliptical, corrugated, or any other desired figure of cross-section.

To the free end of rod D outside the open end of tube A may be attached any desired mechanical means for amplifying the effect of its rotation, such as a lever, a gear segment, or a pulley. Such rotation of rod D may be employed directly or indirectly to operate valves or other mechanical devices, to open or close electric circuits, or to actuate the mechanism of indicating or recording instruments which may be employed in connection with the motion transmitted through wall B from some source of motion on its opposite side.

Torsion may be applied to the sealed end of tube A through mechanism actuated by a float in a tank, a piston, a diaphragm, a bellows, or in fact any desired means through which such torsional deformation of the tube A can be produced, and as such force is opposed either wholly or in part by the elastic resistance of the material of the tube A, it follows that the elastic deformations of the tube A will be proportional to the force applied to produce this deformation. The strict proportionality of the motion produced on one side of the wall, to the force operating to produce this motion on the other side of the wall, can thus be utilized in indicating or recording the magnitude of this force, or through appropriate mechanism, of controlling the magnitude of the force itself.

In Figure 2 the essential elements of the invention are unchanged, but in this case the force applied to produce a deformation of tube B is applied so as to produce a transverse instead of a torsional stress in tube B. Under these conditions, the deformations of the tube B will be transverse to its axis, the tube being deflected from its original position, and the motion being transmitted through the wall B through the lateral movement of the free end of rod D outside the tube A. This motion, as before pointed out, may by appropriate mechanical means be amplified in any desired manner and to any desired end.

In Figure 3, a modification of the invention is shown, the tube A extending from one wall B to another wall F, the tube A having attached firmly to it at some intermediate point G a rod D extending in both directions from its point of attachment to tube A. In this case also it is quite obvious that force applied in a direction transverse to the axis of the tube A will produce a lateral deflection of this tube and a corresponding movement of the ends of rod D which movement may be utilized as before described.

In Figures 4 and 5 is shown a specific application of the preferred form of this invention to the operation of the mechanism of an indicating or recording instrument for differential fluid pressures. In this application, a bellows is mounted in a chamber 5, in such a manner that the two fluid pressures, the difference between which is to be indicated or recorded, act one on the inside and one on the outside of said bellows 4. Attached to the head 6 of said bellows 4 through connection 7 is the end of the lever 8, which is firmly secured to the closed end of tube A. At the free end of rod D suitable means such as lever 9, link 10 and pen-arm 11 are provided whereby the elastic deformation of tube A causes a movement of pen-arm or indicator 11 proportional to the force applied to produce torsion in the tube A and the elastic deformation of tube A around its axis as a result of the application of this stress.

I claim:

1. In a device for transmitting motion, a tube, a wall fixed to and in effect integral with each end of said tube, a rod extending through said tube, means securing said tube, means securing the rod to said tube between said walls, means for applying force to produce elastic deformation of the tube, and means for utilizing the motion of said rod produced by said elastic deformation.

2. In a device for transmitting motion, two walls, a tube fixed at its ends respectively to said walls and in effect integral therewith, said tube being open at both ends, a rod extending through said tube and beyond the ends thereof, means securing the rod to the tube between said walls, means for applying force to the tube to produce elastic deformation thereof, and means for utilizing the motion of said rod produced by said elastic deformation.

In testimony whereof, I have signed my name to this specification at Los Angeles, California, this 17th day of October, 1928.

GEORGE S. BINCKLEY.